United States Patent [19]

Schenkel et al.

[11] 4,219,816
[45] Aug. 26, 1980

[54] METHOD OF AND APPARATUS FOR ANGULAR MEASUREMENT IN TARGET TRACKING RADAR SYSTEMS

[75] Inventors: Albert Schenkel, Regensdorf; Urs Leuenberger, Bonstetten, both of Switzerland

[73] Assignee: Siemens-Albis Aktiengesellschaft, Zürich, Switzerland

[21] Appl. No.: 972,886

[22] Filed: Dec. 26, 1978

[30] Foreign Application Priority Data

Feb. 9, 1978 [CH] Switzerland .......................... 1445/78

[51] Int. Cl.² .............................................. G01S 9/22
[52] U.S. Cl. ................................ 343/16 M; 343/5 NQ
[58] Field of Search .......................... 343/16 M, 5 NQ

[56] References Cited

U.S. PATENT DOCUMENTS 4,084,160 4/1978 Leuenberger et al. ............ 343/16 M

Primary Examiner—Maynard R. Wilbur
Assistant Examiner—Richard E. Berger
Attorney, Agent, or Firm—Werner W. Kleeman

[57] ABSTRACT

Radar tracking or homing units employing three or more primary radiators and utilizing an arrangement of a sum-difference network and signal processing stage to form sum, difference and cross-related or cross-term signals and to effect correction of errors introduced due to the presence or apparent presence of two targets with the resolvable radar volume, using a stipulated method of signal processing.

5 Claims, 4 Drawing Figures

METHOD OF AND APPARATUS FOR ANGULAR MEASUREMENT IN TARGET TRACKING RADAR SYSTEMS

BACKGROUND OF THE INVENTION

The present invention relates to systems for and methods of angular measurement in tracking radar units capable of operation in a two-target situation, which unit comprises at least three primary radiators or feeds, and wherein means are provided to produce a sum signal, together with two difference signals and an additional cross-term signal from echo signals received by the primary radiators or feeds in a sum-difference network, when operating.

In target tracking and target homing with the help of radar devices, the multi-target problem is particularly important. This problem arises when a plurality of closely adjacent targets exists, since these must be separately distinguished by any efficient radar device. If one single pinpoint target lies within the radar units of resolution, whose accuracy is governed by the beam width and by the transmitted pulse duration, then conventional tracking radar systems do in fact permit highly accurate target resolution within this illuminated radar volume without further precautions and in a modern monopulse radar unit the angular resolution readily reaches values around one hundredth of the beam width. However, as is known, in such systems the angular measurement accuracy drops by one or more orders of magnitude as soon as there is a plurality of pinpoint targets, or one single pinpoint target which is no longer punctiform in appearance, lying within the radar scanned volume. The latter situation is referred to as a target "glint" and cannot be clearly detected, whereas the former situation will be specifically referred to in the following under the term "multi-target problem". Thus two or more targets can, in the absence of further measures, be incorrectly indicated as one single target by the radar device. When tracking multiple targets, the radar devices consequently continuously respond to a fictive target which may lie outside the volume to which the homing is directed, as determined by the various targets. If the target separation is not effected in adequate time, it is not possible for an effective firing control to take place.

Particular prominence in the multi-target problem is assumed by the situation in which two targets are apparently present, which may both be real flying objects in the radar volume under surveillance, or one single real flying object whose reflection simulate a second, virtual flying body via a smooth surface reflective to microwaves.

This second situation is known as the mirror effect, and is a problem particularly to be considered when working over water surfaces. A characteristic of the mirror effect is that the real target and the mirror image always lie on a normal to a mirror surface, and thus in the case of a water surface, on a vertical line. Moreover, any changes in target and mirror image are closely linked to one another, which is manifest in a very small range difference and in a scarcely distinguishable Doppler shift. In contrast, in a normal two-target situation there is normally no relationship between the two targets.

German Patent Publication No. 1,900,854 discloses a method of recognising the simultaneous existence of two or more closely adjacent radar objects in the directional diagram of a radar antenna system. This method is provided for phase monopulse processes and requires at least five receiving antennae for a two-target situation and (2n+1) receiving antenna for any n-target situation, which leads to an uneconomically high expenditure in respect of receiving antennae.

Swiss Pat. No. 592,887 and the corresponding U.S. Pat. No. 4,084,160 discloses a method for correcting such mirror effect in target tracking radar units comprising at least three primary radiators or feeds, of which at least two are aligned in such manner that a plane passing through the longitudinal axes of their radiation characteristics is at least approximately at right angles to the reflective surface, a sum-difference network being employed to provide a sum signal and two difference signals, together with a cross-term signal formed in at least one measuring interval, these being produced from echo signals received by the primary radiators.

In accordance with this proposed known method, an angular or angle error signal broken down into two components $E_{KQ}$, $E_{KP}$ is produced from these signals, and a signal processing stage provides a correction signal $F_\Delta$ corresponding to the formula:

$$F_\Delta = -E_{EQ} \cdot E_{KP}/E_{KQ} + F_{\Delta R}$$

in order to correct any angular error signal known per se which has been adulterated by mirror effects. In this formula:

$E_{EQ}$ = the angular error signal component falsified by mirror effects in quadrature to the sum signal;

$E_{KP}$ = the angular error signal component in phase with the sum signal, derived from the cross-term function;

$E_{KQ}$ = the angular error signal component in quadrature to the sum signal derived from the cross-term function;

$F_{\Delta R}$ = the residual correction.

Although a process of this kind is highly suitable for correcting those errors in target tracking radar devices that are caused by reflective surfaces, it does not take into account the general two-target situation.

SUMMARY OF THE INVENTION

Therefore an important object of the present invention is to provide methods of and radar units for improving the tracking accuracy in the case of two targets, while ensuring that a correct zero for the radar angular error voltages is maintained both when the radar axis is aligned to the one and to the other target, as a result of which any angular errors are considerably reduced and any jumping of the radar axis with respect to the targets can be substantially avoided.

The invention consists in a method of angular measurement for use in a radar unit when operating in a two-target situation, said unit comprising at least three primary radiators, in which method the steps of forming a sum signal, two difference signals and an addition cross-term signal are effected in a sum-difference network by processing components of received echo signals at the primary radiators, these signals then being used to produce a function error signal z which is determined by the quotient which is formed by an angle error signal component $E_{KP}$ obtained from a cross-term function in phase with the sum signal, and an angle error signal component $E_{KQ}$ obtained from the cross-term function in quadrature to the sum signal, and thereafter producing in a signal processing stage two correcting signals $F_{\Delta A}$ and $F_{\Delta E}$ respectively corresponding to the formulae:

$$F_{\Delta A} = -E_{AQ}z + F_{\Delta RA}$$

and $$F_{\Delta E} = -E_{EQ}z + F_{\Delta RE};$$

wherein:

$$z = E_{KP}/E_{KQ};$$

these serving to correct angle error signals $E_{AP}$ and $E_{EP}$ which have been falsified by the presence of a second target, wherein the corrected azimuth angle error signal $\epsilon_\alpha$ and the corrected elevation angle error signal $\epsilon_\lambda$ are governed by the expressions:

$$\epsilon_\alpha = E_{AP} + F_{\Delta A}$$

and $$\epsilon_\lambda = E_{EP} + F_{\Delta E};$$

$E_{AP}$ being the azimuth angle error signal component falsified by the two-target effect in phase with the sum signal.

$E_{EP}$ being the elevation angle error signal component falsified by the two-target effect in phase with the sum signal.

$E_{AQ}$ being the azimuth angle error signal component falsified by the two-target effect in quadrature to the sum signal;

$E_{EQ}$ being the elevation angle error signal component falsified by the two-target effect in quadrature to the sum signal;

$F_{\Delta RA}$ being the residual correcting element for the azimuth correcting signal; and $F_{\Delta RE}$ being the residual correcting element for the elevation correcting signal.

A method of this kind can be carried out with a relatively inexpensive target tracking radar unit comprising only four primary radiators or feeds. Although a study carried out by Peyton Z. Peebles Jr. (IEEE-AES-7, No. 6, November, 1971) suggests that a target tracking radar system comprising only four primary radiators is fundamentally inadequate for overcoming the two-target problem, as a rule the process can result in a considerably smaller deviation of the radar axis from the desired target point.

Advantageously, a function error signal z necessary for correcting purposes can be derived directly from a regulating amplifier in which a regulating loop is arranged in such manner that the square or quadrature signal assumes a constant amplitude in the cross-channel. This obviates the need to maintain the associated Doppler amplifier in synchronism relative to that of the sum-elevation- and azimuth channels. It also proves advantageous to be able to use the function error signal z in the same way in order to correct the azimuth and elevation error.

In a further development of the invention, the radiators can also be arranged to be rotatable about the axis of rotation in such manner that optimum error gradients can be achieved at all times in the cross-term signal for arbitrary target configurations.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
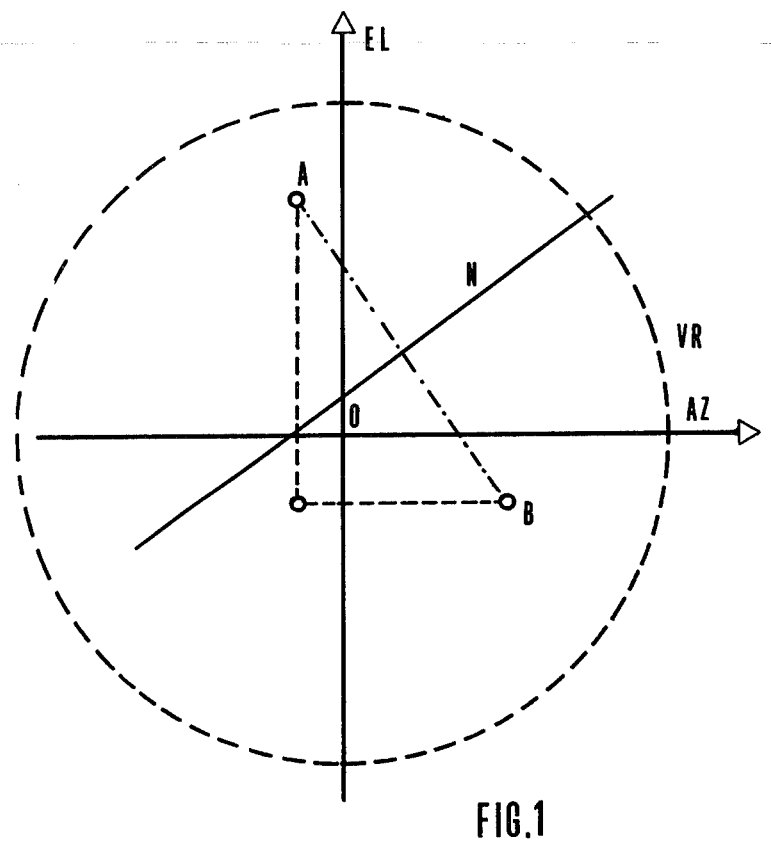
FIG. 1 is an explanatory graph.

FIG. 1 schematically illustrates the positions of two flying objects A and B which occupy arbitrary positions, although inside the radar volume VR defined by the beam width, range and pulse characteristics of the radar unit. The selected illustration contains the radar beam axis O, which is normal to the drawing plane; and angle coordinates of the radar will be given with respect to an azimuthal axis AZ and an elevation axis EL.

If one considers the connecting path AB and considers a central line N to define a plane normal thereto, this can be considered as a virtual mirror plane. Then the target A could be a mirror image of target B relative to this virtual mirror plane, and vice versa. By breaking down the reflection on the virtual mirror plane arranged at an arbitrary spatial angle into one component in the azimuth direction and one component in the elevation direction, the radar axis can be controlled to the target A or B.

Then the correction formulae in the two angle coordinates are, for the corrected elevation error signal $\epsilon_\lambda$:

$$\epsilon_\lambda = E_{EP} - E_{EQ}z + F_{\Delta RE}$$

and for the corrected azimuth error signal $\epsilon_\alpha$:

$$\epsilon_\alpha = E_{AP} - E_{AQ}z + F_{\Delta RA}$$

Figure 2:
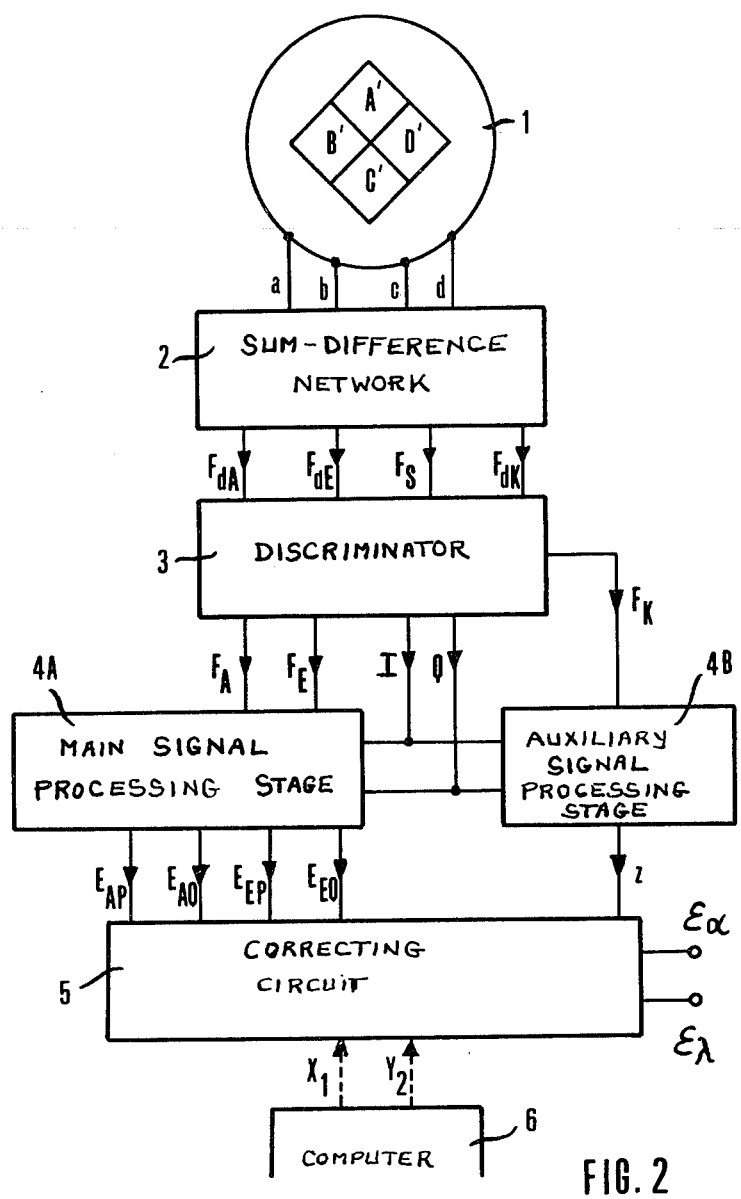
FIG. 2 is a block schematic circuit diagram of one exemplary embodiment.

The target tracking radar unit schematically illustrated in FIG. 2 employs a monopulse antenna 1 comprising the primary feeds or radiators A', B', C' and D' which serve to receive echo signals a, b, c and d, from which the following useful signals are obtained in a following sum-difference network 2:

One sum function signal:

$$F_S = a + b + c + d;$$

two difference function signals:

$$F_{dA} = d - b$$

and $F_{dE} = a - c;$ and one cross-term function signal:

$$F_{dK} = (a + c) - (b + d).$$

These echo signals can be handled in the sum-difference network 2 exactly as described in the aforementioned U.S. Pat. No. 4,084,160, the disclosure of which is incorporated herein by reference.

A discriminator 3, to whose inputs are fed the resultant signals $F_{dA}$, $F_{dE}$, $F_S$ and $F_{dK}$, prepares an angle error function signal having the azimuthal component $F_A = F_{dA}/F_S$ and the elevation component $F_E = F_{dE}/F_S$, and these are fed to the input of a main signal processing stage 4A from which are derived the following:

an azimuth angle error signal component $E_{AP}$ which is falsified by the two-signal effect, such that $$E_{AP} = Re[F_A(Y_1, Y_2)]$$

in phase to the sum signal;
an elevation angle error signal component $E_{EP}$ which is falsified by the two-target effect, such that $$E_{EP} = Re[F_E(X_1, X_2)]$$

in phase to the sum signal;
an azimuth angle error signal component $E_{AQ}$ which is falsified by the two-target effect, such that $$E_{AQ} = Im[F_A(Y_1, Y_2)]$$

in quadrature to the sum signal;
and an elevation angle error signal component $E_{EQ}$ which is falsified by the two-target effect, such that $$E_{EQ} = Im[F_E(X_1, X_2)]$$

in quadrature to the sum signal;
and wherein:
Re: a real component;
Im: an imaginary component;
$X_1$, $X_2$ = respective angles relative to the direction finding axis O in the elevation angle plane; and
$Y_1$, $Y_2$ = respective angles analogous to the angles $X_1$, $X_2$ but in the azimuthal angle plane (not shown).

The discriminator 3 also produces an angle error function signal of the cross-term:

$$F_K = F_{dK}/F_S;$$

and this is fed to the input of an auxiliary signal processing stage 4B, which derives a function error signal:

$$Z = \frac{Re[F_K(X_1, X_2, Y_1, Y_2)]}{Im[F_K(X_1, X_2, Y_1, Y_2)]}$$

This function error signal z is fed to one input of a correcting circuit together with the output signals $E_{AP}$, $E_{EP}$, $E_{AQ}$ and $E_{EQ}$ from the main signal processing stage, which are fed to respective further inputs.

The correcting circuit 5 emits both the corrected azimuth angle error signal $$\epsilon_a = E_{AP} + F_{\Delta A}$$

and the corrected elevation angle error signal $$\epsilon_\lambda + E_{EP} + F_{\Delta A}.$$

A sum in-phase reference signal I and a sum quadrature reference signal Q are formed in the discriminator 3 and fed to the stages 4A and 4B, as will be described in detail with reference to FIGS. 3 and 4.

A computer 6 can likewise be connected to the correcting circuit 5 if required in any specific radar application, where the elevation and azimuthal data of the axis O at any instant are not readily available to be supplied by conventional means (not shown).

Figure 3:
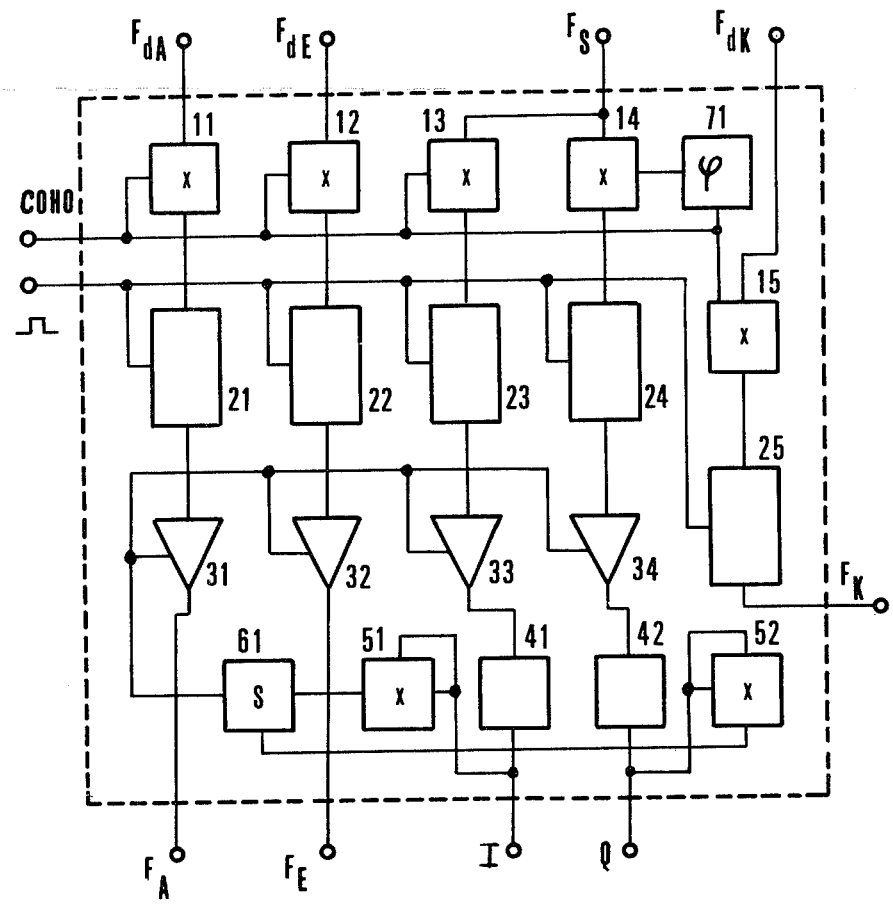
FIG. 3 illustrates schematically an alternative form of discriminator for use in the FIG. 2 embodiment.

FIG. 3 illustrates a discriminator which can be used, for example, in place of the discriminator 3 in FIG. 2. This discriminator contains five separate product demodulators 11, 12, 13, 14 and 15, and specifically demodulator 11 for the signal $F_{dA}$, demodulator 12 for the signal $F_{dE}$, demodulators 13 and 14 for the signal $F_S$, and demodulator 15 for the signal $F_{dK}$. Each demodulator has a second input to which a coho reference oscillator output signal is applied in known manner.

The outputs of these five demodulators 11 to 15 are separately connected to respective gated Doppler extraction circuits 21 to 25 respectively, to second inputs of which are fed a gating pulse-input in known manner. The circuits 21 to 24 have their respective outputs connected to separate Doppler amplifiers 31 to 34, which each have a control connection to a summing element 61, to be described, which standardises the respective outputs to sum.

The output of the Doppler amplifier 33 is connected via a reference circuit 41 for the formation of the signals I in phase to the sum signal, which in the following will be referred to as sum in-phase reference circuit, and via a following multiplier 51 to a first input of the summing element 61. The output of the Doppler amplifier 34 is connected via a reference circuit 42 for the formation of the signal Q quadrature to the sum signal, which in the following will be referred to as sum quadrature reference circuit, and this signal Q is fed via a multiplier 52 to a second input of the summing element 61. The two separate inputs of the multipliers 51 and 52 are each commonly connected to the respective outputs of the associated circuits 41 or 42.

The discriminator illustrated in FIG. 3 functions as follows: the signals $F_S$, $F_{dA}$, $F_{dE}$ and $F_{dK}$ from the sum-difference network 2 (FIG. 2) are demodulated in the respective product demodulators 11, 12, 13 and 15 by product formation with the COHO signal receiving coherent. As a result of an additional demodulation in the sum channel, but with the COHO signal rotated through a phase angle $\phi = \pi/2$ by a phase shift device 71, a quadrature component is formed in the product demodulator 14.

In the gated Doppler extraction circuits 21 to 25 all the signals are then keyed, integrated and each fed via a respective hold circuit to associated Doppler filters. In the respective Doppler amplifiers 31 to 34, the corresponding signals are respectively amplified so that the amplitude of the sum signal remains constant, i.e.:

$$I^2 + Q^2 = \text{constant}$$

where I is the sum in-phase reference signal at the output of the sum in-phase reference circuit 41, and Q is the sum quadrature reference signal at the output of the sum quadrature reference circuit 42.

The outputs of the Doppler amplifiers 31 and 32 and the output of the gated Doppler extraction circuit 25 provide respective outputs of the discriminator 3 for the corresponding output signals $F_A$, $F_E$ and $F_K$.

Figure 4:
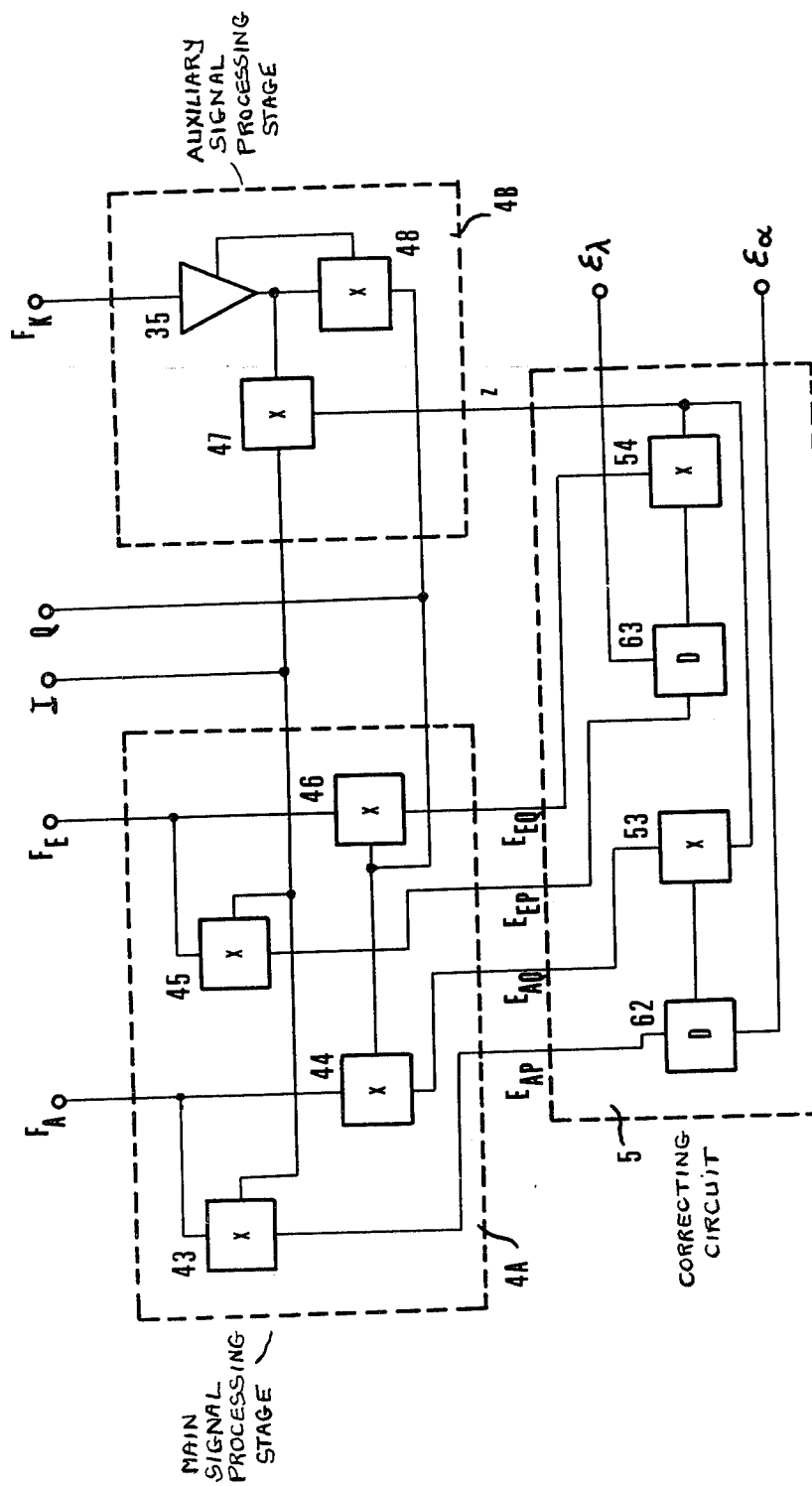
FIG. 4 shows further details of the FIG. 2 embodiment.

Details of the main signal processing stage 4A of FIG. 2 are shown in FIG. 4. It comprises four multipliers 43 to 46, the inputs of the first two multipliers 43 and 44 being commonly fed by the azimuthal angle signal $F_A$, and the signal inputs of the two multipliers 45 and 46 being commonly fed by the elevation angle signal $F_E$, each multiplier having a reference input, which in the case of the multipliers 43 and 45 are commonly fed with the sum in-phase reference signal I, and in the case of the multipliers 44 and 46 are commonly fed with the sum quadrature reference signal Q. The outputs of the multipliers 43, 44, 45 and 46 emit the signals $E_{AP}$, $E_{AQ}$, $E_{EP}$ and $E_{EQ}$ respectively.

Details of the auxiliary processing stage 4B of FIG. 2 are also shown in FIG. 4. This comprises two multipliers 47 and 48 each of whose signal inputs is connected to the output of a Doppler amplifier 35, to whose input is fed the signal $F_K$, this amplifier 35 having a control input that is connected to the output of the multiplier 48.

The reference input of the multiplier 48 is fed with the sum quadrature reference signal Q, and the reference input of the multiplier 47 is fed with the sum in-phase reference signal I. The output of the multiplier 47 supplies the function error signal z and thus simultaneously constitutes the output of the auxiliary processing stage 4B.

Details of a preferred construction of the correcting circuit 5 of FIG. 2 are also shown in FIG. 4. This comprises two multipliers 53 and 54, whose outputs are separately connected to one input of an associated subtractor element 62 and 63 respectively. The other input of the subtractor element 62 is fed by the signal $E_{AP}$, and the other input of the subtractor element 63 is fed by the signal $E_{EP}$. The multipliers 53 and 54 each have one input fed by the function error signal z and their respective second inputs are separately fed by the signal $E_{AQ}$ and $E_{EQ}$ respectively.

Consequently the outputs of the respective subtractor elements 62 and 63 are substantially equal to the requisite corrected error signals $\epsilon_\alpha$ and $\epsilon_\lambda$ which can be expressed as follows:

$$\epsilon_\alpha \approx E_{AP} - E_{AQ} z$$

and $$\epsilon_\lambda \approx E_{EP} - E_{EQ} z$$

While there are shown and described present preferred embodiments of the invention, it is to be distinctly understood that the invention is not limited thereto, but may be otherwise variously embodied and practiced within the scope of the following claims.

Accordingly, What we claim is:

1. A method of angular measurement for use in a radar unit when operating in a two-target situation, said unit comprising at least three primary feeds, in which method the steps of forming a sum signal, two difference signals and an addition cross-term signal are effected in a sum-difference network by processing components of received echo signals at the primary feeds, using these signals to produce a function error signal z which is determined by the quotient which is formed by an angle error signal component $E_{KP}$ obtained from a cross-term function in phase with the sum signal, and an angle error signal component $E_{KQ}$ obtained from the cross-term function in quadrature to the sum signal, and thereafter producing in a signal processing stage two correcting signals $F_{\Delta A}$ and $F_{\Delta E}$ respectively corresponding to the formulae:

$$F_{\Delta A} = -E_{AQ} z + F_{\Delta RA}$$

and $$F_{\Delta E} = -E_{EQ} z + F_{\Delta RE};$$

wherein:

$$z = E_{KP} / E_{KQ};$$

these serving to correct angle signals $E_{AP}$ and $E_{EP}$ which have been falsified by the presence of a second target, wherein the corrected azimuth angle error signal $\epsilon_\alpha$ and the corrected elevation angle error signal $\epsilon_\lambda$ are governed by the expressions:

$$\epsilon_\alpha = E_{AP} + F_{\Delta A}$$

and $$\epsilon_\lambda = E_{EP} + F_{\Delta E};$$

$E_{AP}$ being the azimuth angle error signal component falsified by the two-target effect in phase with the sum signal;

$E_{EP}$ being the elevation angle error signal component falsified by the two-target effect in phase with the sum signal;

$E_{AQ}$ being the azimuth angle error signal component falsified by the two-target effect in quadrature to the sum signal;

$E_{EQ}$ being the elevation angle error signal component falsified by the two-target effect in quadrature to the sum signal;

$F_{\Delta RA}$ being the residual correcting element for the azimuth correcting signal; and $F_{\Delta RE}$ being the residual correcting element for the elevation correcting signal.

2. The method as claimed in claim 1, in which the signal z required for correcting purposes is directly obtained from a regulating amplifier having a regulating loop arranged in such manner that the quadrature signal assumes a constant amplitude in a cross-channel and so avoid any need to maintain an associated Doppler amplifier in synchronism relative to that of sum, elevation and azimuth channels.

3. The method as claimed in claim 2, in which the signal z is used in the same way for the correction of both the azimuth and elevation errors.

4. The method as claimed in claim 1, in which the primary feeds are arranged to be rotatable about an axis of rotation to provide for adjustment to achieve favorable error gradients in the cross-term signal for a variety of target configurations.

5. A radar tracking or homing unit comprising angular measurement means containing at least three primary feeds, a sum-difference network, and signal processing stage for producing a function error signal z which is determined by a quotient which is formed by an angle error signal component $E_{KP}$ obtained from a cross-term function in phase with a sum signal, and an angle error signal component $E_{KQ}$ obtained from the cross-term function in quadrature to the sum signal.

* * * * *